US005666515A

United States Patent [19]
White et al.

[11] Patent Number: 5,666,515
[45] Date of Patent: Sep. 9, 1997

[54] INFORMATION PROCESSING SYSTEM HAVING MULTIPLE MODULES AND A MEMORY ON A BUS, WHERE ANY MODULE CAN LOCK AN ADDRESSABLE PORTION OF THE MEMORY BY SENDING RETRY SIGNALS TO OTHER MODULES THAT TRY TO READ AT THE LOCKED ADDRESS

[75] Inventors: Theodore Curt White, Tustin; Jayesh Vrajlal Sheth, Mission Viejo; Kha Nguyen, Anaheim; Dan Trong Tran, Laguna Niguel, all of Calif.

[73] Assignee: Unisys Corporation, Blue Bell, Pa.

[21] Appl. No.: 759,996

[22] Filed: Dec. 4, 1996

Related U.S. Application Data

[63] Continuation of Ser. No. 563,137, Nov. 27, 1995, abandoned, which is a continuation of Ser. No. 19,004, Feb. 18, 1993, abandoned.

[51] Int. Cl.⁶ .................... G06F 12/14; G06F 13/18
[52] U.S. Cl. .................. 711/152; 711/150; 711/155; 395/726
[58] Field of Search .................. 395/479, 482, 395/477, 726

[56] References Cited

U.S. PATENT DOCUMENTS

| | | | |
|---|---|---|---|
| 3,108,257 | 10/1963 | Buchholz | 395/490 |
| 3,435,418 | 3/1969 | Evans et al. | 395/601 |
| 3,469,239 | 9/1969 | Richmond et al. | 395/427 |
| 3,528,061 | 9/1970 | Zurcher, Jr. | 395/479 |
| 3,528,062 | 9/1970 | Lehman et al. | 395/670 |
| 3,573,736 | 4/1971 | Schlaeppi | 395/726 |
| 3,706,077 | 12/1972 | Mori et al. | 395/726 |
| 3,771,146 | 11/1973 | Cotton et al. | 395/733 |
| 3,835,260 | 9/1974 | Prescher et al. | 379/237 |
| 3,845,425 | 10/1974 | Clements et al. | 395/479 |
| 3,848,234 | 11/1974 | MacDonald | 395/446 |
| 3,848,235 | 11/1974 | Lewis et al. | 395/438 |
| 3,848,262 | 11/1974 | Belcastro | 360/60 |
| 3,916,384 | 10/1975 | Fleming et al. | 395/476 |
| 3,984,811 | 10/1976 | Nyssens et al. | 395/427 |
| 3,984,814 | 10/1976 | Bailey, Jr. et al. | 395/182.14 |
| 3,984,818 | 10/1976 | Gnadeberg et al. | 395/445 |
| 4,000,485 | 12/1976 | Barlow et al. | 395/726 |
| 4,017,840 | 4/1977 | Schild et al. | 395/491 |
| 4,089,052 | 5/1978 | Grumer | 395/494 |

(List continued on next page.)

OTHER PUBLICATIONS

"PLUS405-55 Field-Programmable Logic Sequencer (16× 64×8)" Oct. 1969, pp. 344,348 in *Signetics PLD Data Handbook 1990: Programmable Logic Device* (North American Philips, Jan. 1990).

*Primary Examiner*—Eddie P. Chan
*Assistant Examiner*—Reginald G. Bragdon
*Attorney, Agent, or Firm*—Charles J. Fassbender; Mark T. Starr; Steven R. Petersen

[57] ABSTRACT

Apparatus and method are provided for preventing access to a memory location while that memory location is being modified, updated, etc. When a peripheral device wishes to accomplish such a change at a memory location, it provides the changed data and its intended memory address to an input/output unit. The input/output unit includes a plurality of separately controlled multiplexers, the number of multiplexers being preferably selected to correspond to the size (in bits) of a memory data word or packet divided by the size (in bits) of a peripheral data word. The input/output unit reads the data at the requested memory location into an input buffer, combines the portions of that data not to be modified with the data provided by the peripheral, and sends the result back to the same memory location. During this Read-Modify-Write operation, the input/output unit also monitors the system bus for any attempts or requests to read data from, or write data to, the memory address for which the Read-Modify-Write operation is being performed. In such event, a signal is sent to the module making such attempt or request, asking or telling that module to wait. That signal is removed when that Read-Modify-Write operation is completed.

1 Claim, 5 Drawing Sheets

U.S. PATENT DOCUMENTS

| | | | |
|---|---|---|---|
| 4,099,243 | 7/1978 | Palumbo | 395/490 |
| 4,136,386 | 1/1979 | Annunziata et al. | 395/446 |
| 4,157,586 | 6/1979 | Gannon et al. | 395/469 |
| 4,157,587 | 6/1979 | Joyce et al. | 395/464 |
| 4,162,529 | 7/1979 | Suzuki et al. | 395/726 |
| 4,214,304 | 7/1980 | Shimizu et al. | 395/479 |
| 4,394,725 | 7/1983 | Bienvenu et al. | 395/676 |
| 4,394,733 | 7/1983 | Swenson | 395/403 |
| 4,561,051 | 12/1985 | Rodman et al. | 395/425 |
| 4,785,394 | 11/1988 | Fischer | 395/294 |
| 4,858,116 | 8/1989 | Gillett, Jr. et al. | 395/325 |
| 4,870,704 | 9/1989 | Matelan et al. | 395/800 |
| 4,920,483 | 4/1990 | Pogue et al. | 395/421.09 |
| 4,937,733 | 6/1990 | Gillett, Jr. et al. | 395/325 |
| 4,941,083 | 7/1990 | Gillett, Jr. et al. | 395/325 |
| 4,941,182 | 7/1990 | Patel | 382/141 |
| 4,949,239 | 8/1990 | Gillett, Jr. et al. | 395/325 |
| 4,975,870 | 12/1990 | Knicely et al. | 395/479 |
| 5,016,162 | 5/1991 | Epstein et al. | 395/730 |
| 5,067,071 | 11/1991 | Schanin et al. | 395/293 |
| 5,068,781 | 11/1991 | Gillett, Jr. et al. | 395/325 |
| 5,072,369 | 12/1991 | Theus et al. | 395/425 |
| 5,088,028 | 2/1992 | Theus et al. | 395/325 |
| 5,146,588 | 9/1992 | Crater et al. | 395/182.04 |
| 5,150,467 | 9/1992 | Hayes et al. | 395/325 |
| 5,283,870 | 2/1994 | Joyce et al. | 395/479 |
| 5,506,971 | 4/1996 | Gullette et al. | 395/473 |

FIG._4

INFORMATION PROCESSING SYSTEM HAVING MULTIPLE MODULES AND A MEMORY ON A BUS, WHERE ANY MODULE CAN LOCK AN ADDRESSABLE PORTION OF THE MEMORY BY SENDING RETRY SIGNALS TO OTHER MODULES THAT TRY TO READ AT THE LOCKED ADDRESS

This application is a continuation of Ser. No. 08/563,137, filed Nov. 27, 1995, now abandoned, which is a continuation of Ser. No. 08/019,004, filed Feb. 18, 1993, now abandoned.

FIELD OF THE INVENTION

The present invention relates to electrical computers and data processing systems such as general purpose programmable digital computer systems, and more particularly to system architecture and method employing shared memory, and to common or parallel bus interfacing or communication technique and apparatus. The present invention also relates to intonation processing system organization, and more particularly to system interconnections and to storage accessing and control.

BACKGROUND OF THE INVENTION

There exist applications in which there is a need to prevent one part of a computer from accessing (e.g. read from or write to) a memory location defined by a memory address while another part of the computer is modifying that location, lest the first part utilize outdated data. The present invention fulfills this need.

In a computer system, one or more memories can be so connected to a bus as to be accessible to more than one module of a computer. In a Read-Modify-Write situation, the content of a particular memory address is read, changed, and replaced with the changed content, by one module or part of a computer system. Sometimes, another module attempts to write to or read from the memory at that same particular memory address while the Read-Modify-Write is being accomplished. Where the latter read or write attempt occurs while a Read-Modify-Write is in progress, the memory read/write must be delayed or prevented until the Read-Modify-Write is completed. This is necessary to avoid processing by the system of old or outdated data and any errors that might result from same. Read-Modify-Write has been used to describe a process where memory at a particular memory address is read, the memory content at that location is modified and the modified content is written back into the memory at that same address. In a Read-Modify-Write (RMW) operation., one module of a computer system reads or retrieves data from a memory location or address, performs an operation on the data, and writes the modified data back to the original memory location or address. It is obviously desirable to prevent other modules or parts of the same computer system from accessing that same memory location while an RMW operation is in progress. It is also desirable to be able to provide such capability to an existing system as an upgrade, particularly if substantial modification of the existing system is not required to implement such an upgrade. The present invention fulfills these needs.

While other systems include structure intended to perform RMW operations, they have not proven entirely satisfactory in that they involve incorporation of the RMW circuitry into the computer system's memory, or direct connection of the RMW circuitry to, and thus modification of, the computer systems' memory. For example, an upgrade of a non-RMW or non-lockout capable system to incorporate such capabilities would therefore require modification of one or more major components of such systems. For a multiple-module memory, so placing the RMW logic necessitates repeating the RMW logic for each memory board or module, which is economically undesirable. There would then also be a need to compare the identity of the unit or module for which RMW is being performed, with the identity of the unit or module attempting to access memory during RMW.

SUMMARY OF THE INVENTION

Accordingly, an object of the present invention is to provide apparatus and method for preventing access to a memory location while a Read-Modify-Write operation is being performed for that memory location.

Another object of the present invention is to provide apparatus and method for temporarily preventing access to a memory location which does not require modification of memory.

A further object of the present invention is to provide apparatus and method for temporarily preventing access to a memory location which can be added to an existing system as an upgrade.

A still further object of the present invention is to provide a single module outside of memory for performing a Read-Modify-Write operation for any memory location, and for preventing access to that memory location during that operation.

Briefly, these and other objects of the present invention are accomplished by a controller that, upon detecting an attempt to access a memory location (also known as or defined as a memory address) for which a Read-Modify-Write operation is then being performed, sends a signal to at least the source of that request to stop or delay that request. In a computer system, at least two computer modules are connected to a memory module via a common bus. Each such module is independently capable of reading from and writing to memory, and at least some of that memory is commonly accessible by these modules. When a Read-Modify-Write operation is being performed on or for a particular memory address, the operating module provides the address to an address register. The controller monitors the bus for any attempt by another module to access memory. The controller also controls any RMW operation. When any module seeks access to a memory location, that module must transmit the address for that location to the memory via the bus. The address thus placed on the bus is compared by a comparator to the value then in the address register for the address for which the RMW operation is being performed. If the two addresses match, while an RMW operation is being performed and a memory access is being attempted, then the controller sends an appropriate signal on the bus which signal is received at least by the module making the later request.

For example, one module could resize data provided by one or more peripheral devices to be written into memory, and the controller could be resident in that module to control that resizing and to detect and lock out any request from any other module for a read or write to the same memory location for which peripheral data is being resized. For this example, the resulting lockout or retry signal would be generated only while an RMW operation is occurring, and another module attempts a memory read or a memory write for the same memory address for which the RMW operation is being performed. That signal could also be generated for handshaking purposes, such as when a register used for the RMW operation is full. Such a resizing operation is one example of an RMW operation.

Other objects, advantages and novel features of the invention will become apparent from the following detailed description of the invention when considered in conjunction with the accompanying drawings wherein:

DETAILED DESCRIPTION

Figure 1:
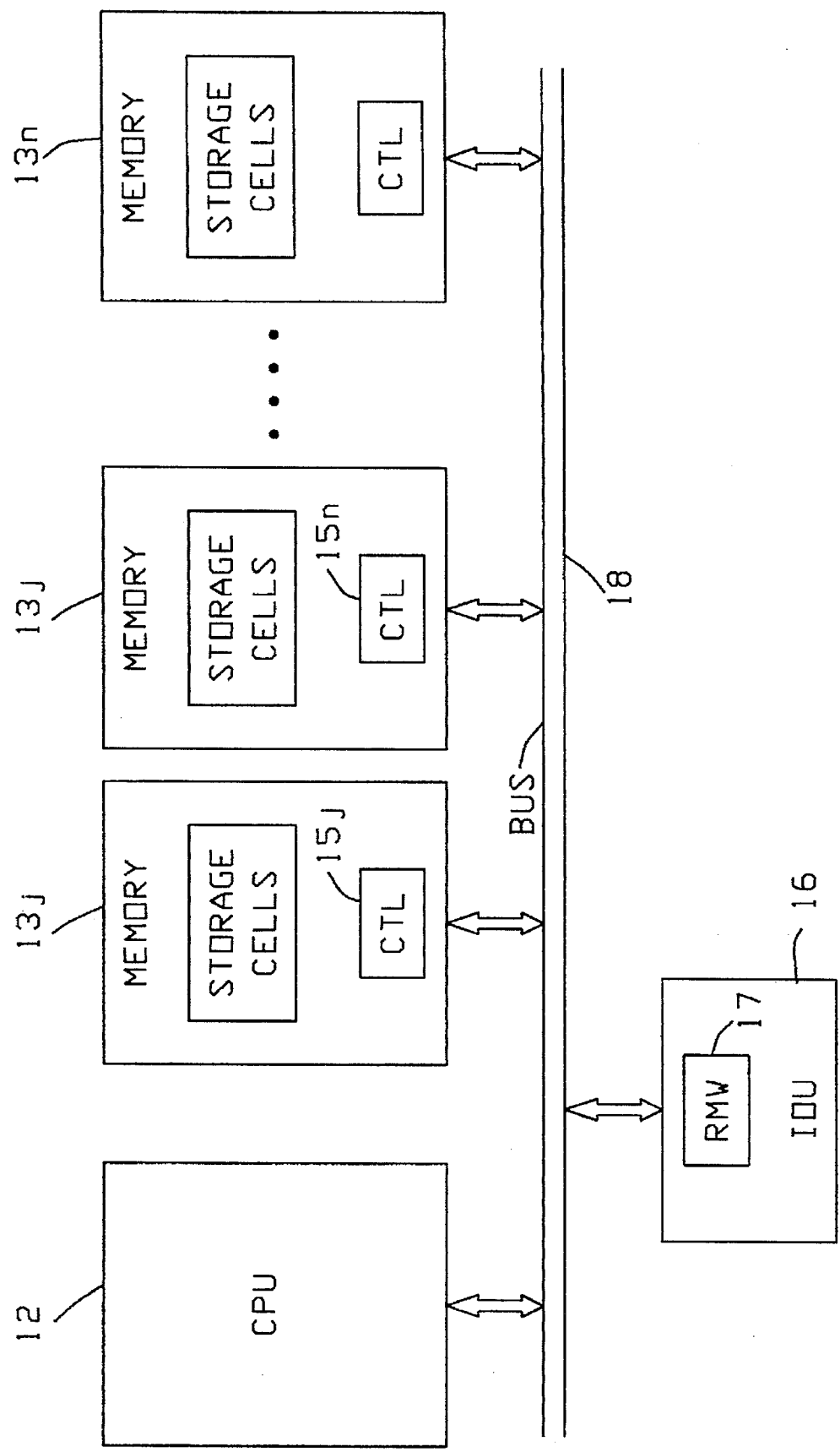
FIG. 1 is a block diagram of a computer system according to the present invention.
Figure 2:
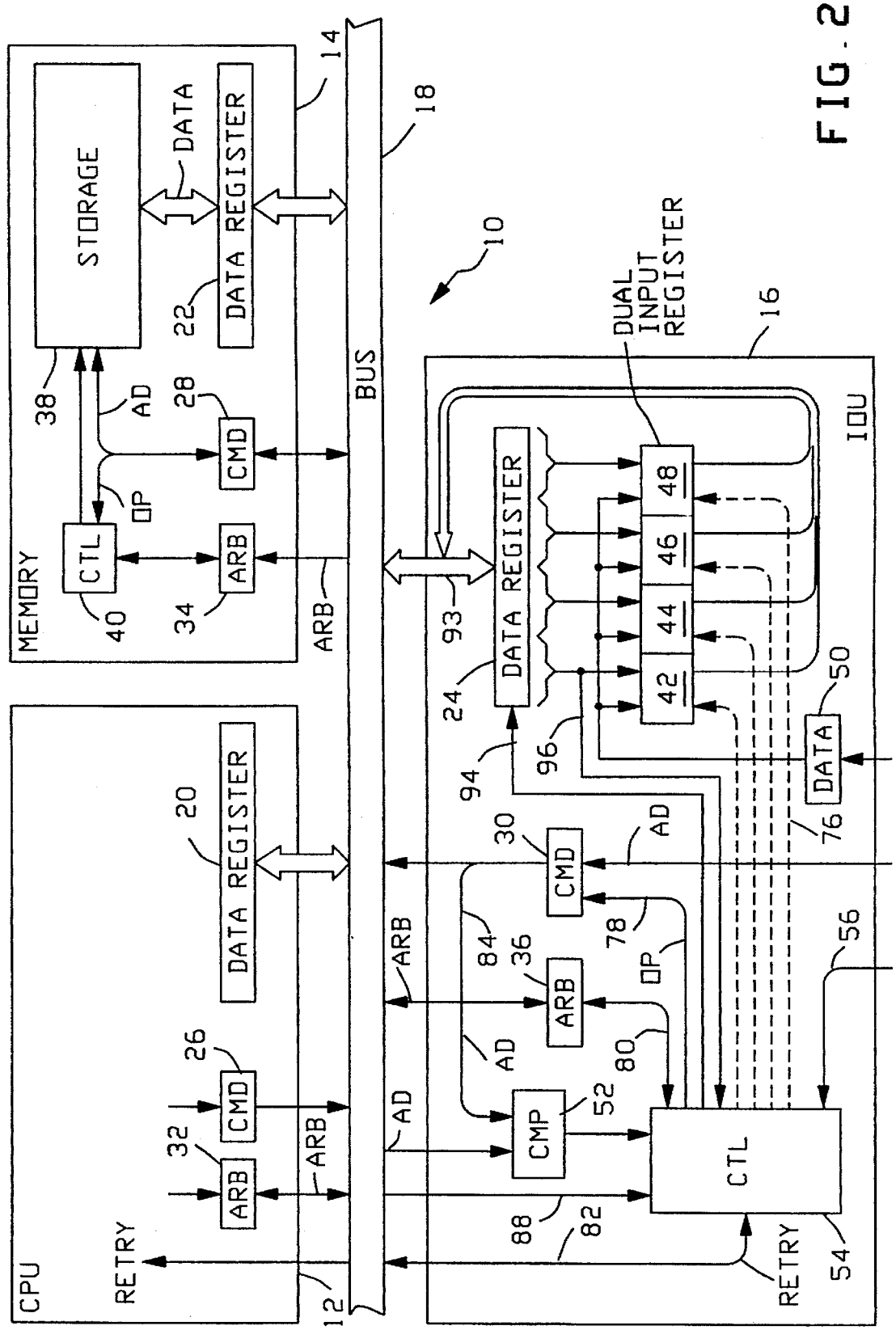
FIG. 2 is a block diagram illustrating a portion of the computer system of FIG. 1 in greater detail.

Referring now to the drawings, wherein like reference characters designate like or corresponding parts throughout the several views, there is shown in FIG. 1 a computer system 10 including a central processing unit (CPU) module 12, memory modules 13$i$, 13$j$, ..., 13$n$ and an input/output unit (IOU) module 16 interconnected by a system bus 18. As shown in FIG. 1, system 10 can include a plurality of memory boards or modules. Each such memory board or module includes storage cells and control logic. Each such memory board or module 13$i$, 13$j$, ..., 13$n$ has its own control logic or controller 15$i$, 15$j$, ..., 15$n$ for management of data communications to and from that board or module. If such control logic or controller was located on only one board or module, and was intended to handle all memory boards or modules, then there would be undesirable delays involved in going to and from it, that are avoided by the distributed control of FIG. 1. Individual memory board structure is shown in FIG. 2. FIG. 1 shows system 10 memory located on a plurality of separate boards, for example to accommodate a large memory capacity or an expandable memory. IOU 16 includes Read-Modify-Write logic 17. Although the system of FIGS. 1–6 is particularly illustrative of the A11 computer produced by Unisys Corporation, the present invention is not limited to that particular computer. In the Unisys A11 computer, there is a variable number of memory boards. Each such memory board has a certain amount of storage cells, and control logic for the storage cells. Thus, the memory is expanded in modules as needed. Also, the memory is fail-soft (the computer can still run, but with reduced memory, if a memory board fails) since a non-working memory board can be removed.

Figure 3:
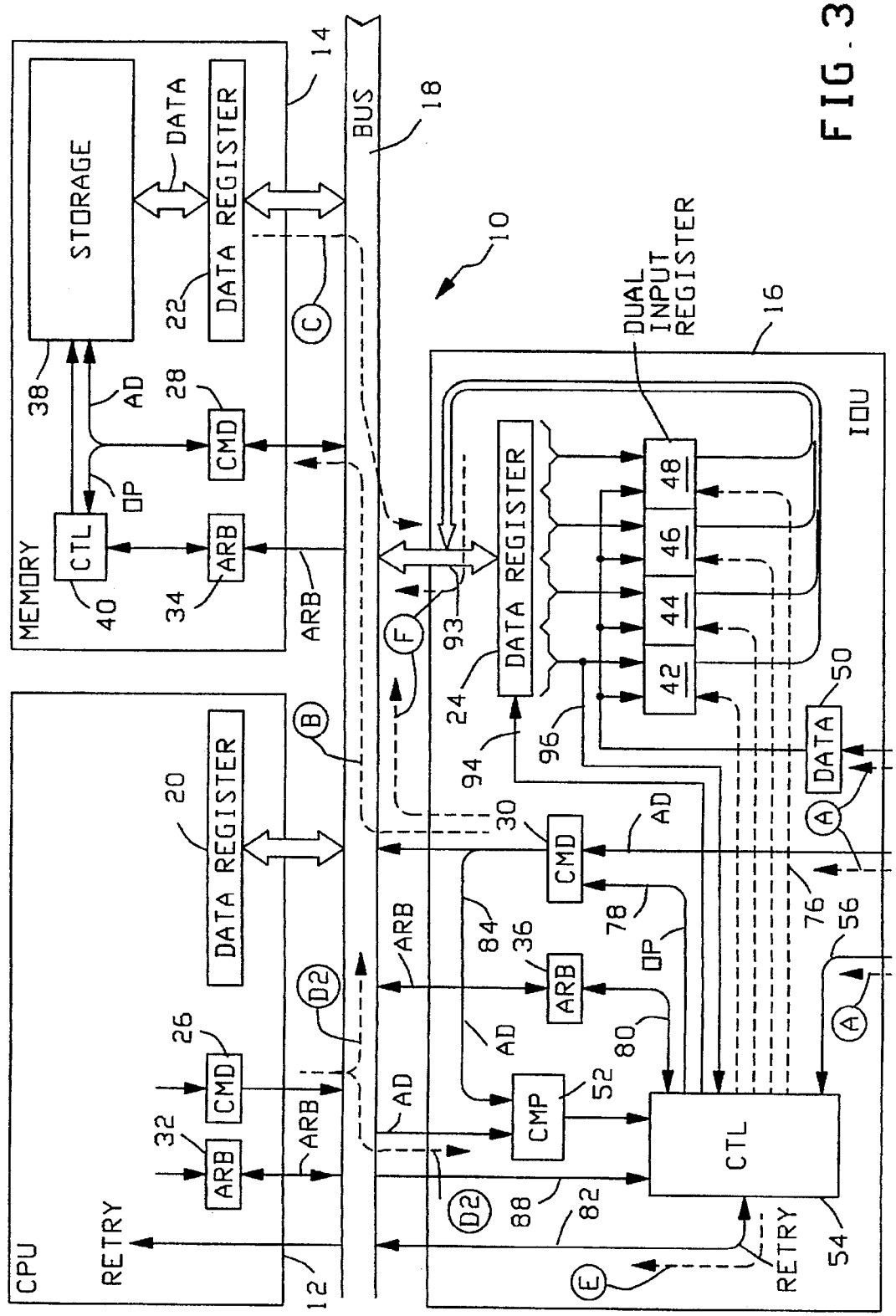
FIG. 3 illustrates, on a block diagram corresponding to that of FIG. 2, various sequential signal paths that occur during one portion of the operation of the system of FIG. 2.

FIG. 2 illustrates some structures in the A11 computer, including a central processing unit (CPU) 12, a memory unit 14 representative of any of memory modules 13$i$, 13$j$, ..., 13$n$, and an input/output unit (IOU) 16, all interconnected by a system bus 18. This structure is also shown in FIG. 3 and in FIG. 5. Each such module 12, 14, 16 includes a respective data register 20, 22, 24, a respective command register 26, 28, 30 and a respective bus arbitration signal register or logic 32, 34, 36. All of these registers are connected to system bus 18. The respective functions of these registers is further discussed below.

CPU 12 includes the usual arithmetic and logic unit (ALU) (not shown) embodied in a combination of hardware and firmware, whose details are not illustrated and are not necessary for understanding of the invention. CPU 12 also includes bus arbitration signal register or bus arbitration logic 32, command register 26 and data register 20, all of which are connected to system bus 18. The bus arbitration signals are used to control access to, and to gain access to, system bus 18. Memory unit 14 likewise includes arbitration signal register or arbitration logic 34, command register 28 and data register 22, also connected with and interfacing memory 14 to system bus 18. Memory unit 14 also includes one or more storage components 38 wherein data can be stored in a plurality of (usually numerous) separately addressable locations. Memory unit 14 command register 28 serves as an address register, and as an operation register loaded by an externally provided operation (OP) code. The operation code and address is provided via bus 18 from another unit. Control logic 40 of memory unit 14 performs the operation specified in the operation code then in register 28, on the data at the memory location of storage component(s) 38 specified in the address accompanying that operation code. I/O unit 16 includes four dual-input registers 42, 44, 46 and 48. Each of registers 42, 44, 46 and 48 has two data inputs, a control input and a data output. A control signal applied to the register control input determines which of the two data inputs is stored in that register and appears at the register data output. Each of registers 42, 44, 46 and 48 could be a combination of a multiplexer having two data inputs and a single data output, and a register having its single data input connected to the single data output of the multiplexer. IOU 16 also includes register 24 connected to system bus 18 and to the four registers 42 through 48. IOU 16 also includes memory address register 30 and data register 50 each connected to receive corresponding signals from one or more peripheral devices (not shown). IOU 16 further includes bus arbitration signal register 36, comparator 52, and controller 54. The peripheral devices (not illustrated) can for example be tape drives, disk drives, etc.

The peripheral devices provide data in "words" which are smaller than the capacity (hereinafter called a packet) of any single memory address location in memory storage module 14. In the example shown in FIGS. 2 through 5, a peripheral word is one-fourth the size of a memory packet, although other proportions could be used. The four registers 42 through 48 are used to collect up to four such peripheral words, in the proper sequence as controlled by IOU controller 54, in register 24, so that the memory sees the same size packet from CPU 12 and from IOU 16 via system bus 18. For example, a single packet size can be equal to 4 words of 52 bits each. Different proportions of peripheral data word size to bus packet size may require correspondingly different numbers of the registers 42 through 48.

Register 24, memory register 22 and CPU data register 20 are all the same size, and correspond to the size of the content of any one memory 14 address location. IOU controller 54 provides control signals to each of the four registers 42 through 48. Conductive paths are provided in the system of FIGS. 2, 3 and 5 for provision of data, address(es) and command(s) from a peripheral to IOU 16. The command signal(s) on command line 56 are provided to IOU controller 54 by the one peripheral (not shown) then providing data. The command signal(s) to IOU 16 tell IOU 16 what to do with the data then being provided to the IOU data register 50 by that peripheral. When a peripheral wishes to write to memory 14, that peripheral provides data to the IOU data buffer 50, a command via line 56 to IOU controller 54 to tell the controller and thus the memory 14 what to do with that data, and a memory address (provided to register 30) for the data. For the four-register example illustrated in FIGS. 2 and 3, up to four peripheral data words are provided to the four registers 42 through 48. Only one of those registers is activated at any one time by a command from IOU controller 54. In general, registers 42 through 48 select an input and are loaded, via control lines 76, by IOU controller 54. When registers 42-48 are full, their contents can then be sent to memory data register 22 via system bus 18. However, registers. 42-48 need not be filled by the peripheral then writing to memory in order for the transfer from those registers to memory data register 22 to occur. Instead, if the peripheral provides data that fills only some of registers 42-48, the remaining such registers are filled by reading the memory address location identified in address register 30, entering the content of that location into register 24, and transferring some of the words from register 24 to some of registers 42-48. This occurs, for example, at the start and/or end of a continuous string of data to/from memory.

Figure 4:
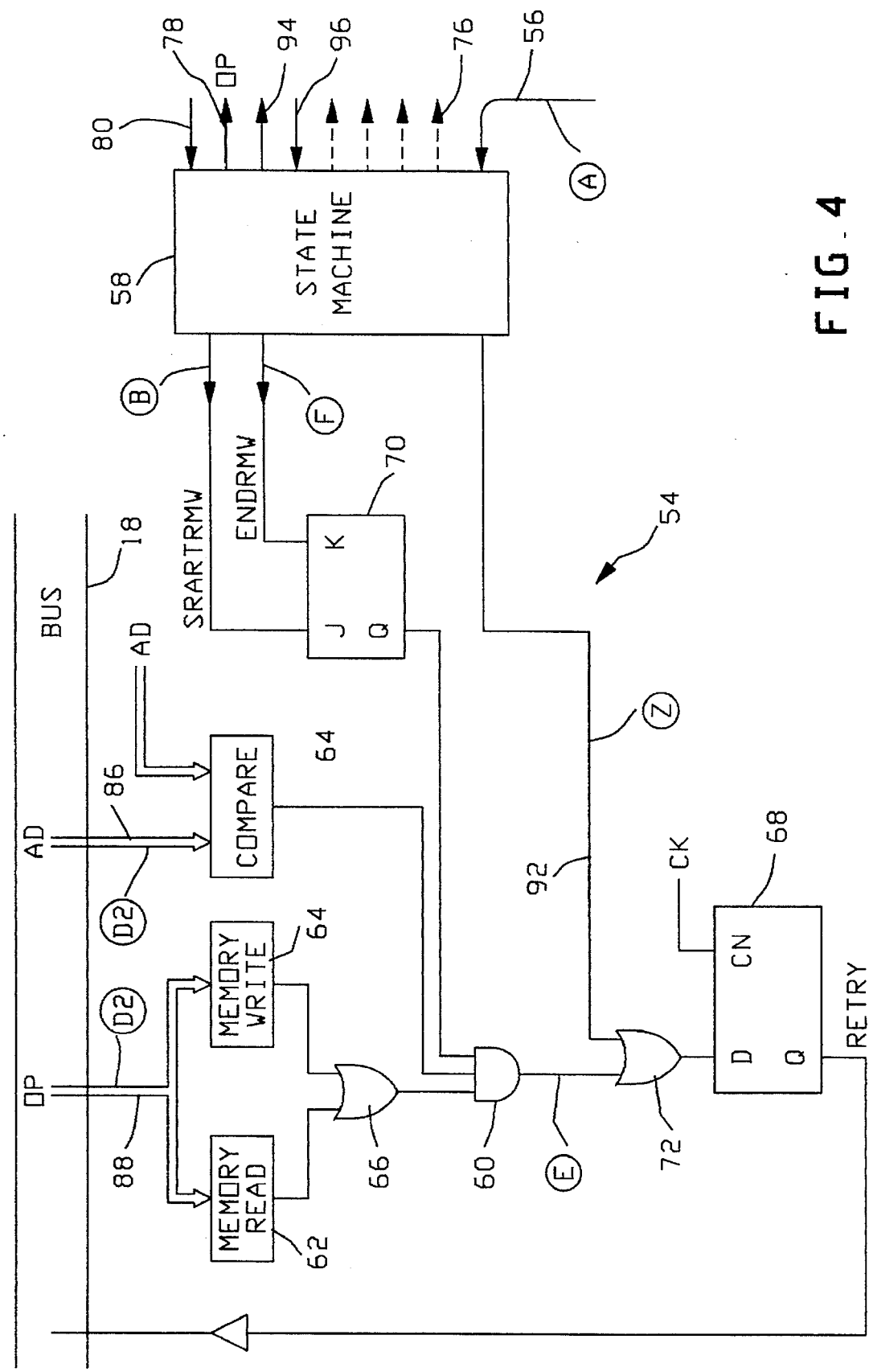
FIG. 4 is a block diagram of a portion of the system of FIGS. 2 and 3 shown in greater detail.

FIG. 3 illustrates one possible signal sequence according to the present invention. If IOU 16 is trying to do a write of less than four words (less than a full packet) to memory 14, that operation must be accomplished by a read from memory to the IOU followed by a write from the IOU to memory. This is because the memory cannot write a single register 42-48 content alone into storage 38. But between that IOU read and IOU write, the CPU cannot be permitted to do a read or a write to the same address as the IOU. At sequence step A, a peripheral address provides command, address, and 1, 2 or 3 data words to the IOU on the respective lines provided for the purpose. Consecutive peripheral words received by IOU 16 from a peripheral device are aligned by controller 54 using registers 42 through 48 and register 24 as described above. At step B, the peripheral address signal and a read operation signal from IOU controller 54 are sent from IOU 16 via system bus 18 to memory 14. At step C, memory unit 14 responds to the IOU 16 read by sending the IOU a packet of four words from the requested memory address. However, IOU 16 will only use some of these words to build a full packet with the words that it received from the peripheral device. Step D shows the IOU "snooping" on the bus. Step D is shown by two signal paths D1 and D2. Independently of what is taking place (discussed above) among the peripheral providing data, IOU 16 and memory unit 14, step D occurs wherein CPU 12 by coincidence is trying to read or write the same memory address that is then being operated on by the IOU. This CPU address is sent on system bus 18 to memory 14 (D1) and that address is also snooped on by IOU comparator 52 (D2). IOU comparator 52 compares the memory 14 address sent by CPU 12 and the address provided by the peripheral, as is also shown in FIG. 4. Signals D1 and D2 are the same signal, but D1 shows the intended signal path from CPU 12 to memory 14, while D2 shows that IOU 16 reads that signal even though the IOU is not the intended recipient; this feature is herein called "snooping". For system bus 18, as with most buses, there is a certain set or field of bits which will specify the destination on the bus as to where all the other information then being provided with that set of bits is intended to go. In FIG. 3, there is a register 26 in CPU 12 which is indicated as the source of information for D1 and D2, but as part of that information there will be a destination field. That destination field will specify that the memory unit 14 on the bus is the unit for which this information is intended. When a message goes out on bus 18, then each module connected to the bus compares its own internal destination number to the destination number that is placed on the bus; if a module detects a match for identical destination fields, then that module takes the message then on the bus. During step D, if the address appearing on bus 18 and the address requested (during step A) by the peripheral via IOU 16 are different, then there is no problem and normal operation can continue. However, if these two addresses are the same, then the CPU 12 could be trying to do a read from memory 14 at the same address that IOU 16 is trying to change. Alternatively, CPU 12 could instead be attempting to do a write to the same address that IOU 16 is trying to change. Although the resulting problem is different for each of these two situations, both are undesirable. For example, provision of old or outdated data respectively to or from CPU 12 could result, or the RMW could be affected. To solve this problem, IOU comparator 52 therefore notifies IOU controller 54 to generate a RETRY signal on line 82 at step E. This retry signal is generated by IOU controller 54 and is provided via system bus 18 to CPU 12 to stop the CPU from sending data to or receiving data from the memory 14. Thereafter, at step F, the writing of a data packet from IOU 16 to memory 14 is accomplished and the retry signal is removed. CPU 12 can then retry its previously attempted memory operation.

The retry signal is produced by IOU comparator 52 and by the portion of IOU controller 54 illustrated in FIG. 4. As is illustrated in FIGS. 3 and 4, IOU comparator 52 receives both an address from CPU 12 on line(s) 86 via system bus 18, and via line(s) 84 an address held by IOU 16 at address register 30 that had been sent by the IOU to memory 14 at the request of the peripheral device. Comparator 52 compares these two address signals; if they are identical, then a true or high bit is provided to AND gate 60. The memory operation code generated by CPU 12 on bus 18 is also snooped on, via line(s) 88, by the two decoders in IOU controller 54 labelled memory read 62 and memory write 64. Memory read 62 decodes the OP code on the bus 18 if it is the OP code for a memory read, and in that event generates a true or high output bit. Memory write 64 decodes the OP code on bus 18 if it is the OP code for a memory write, and in case of a match generates a true or high output bit. If memory read 62 or memory write 64 thereby respectively detect that a memory read or a memory write is being attempted by CPU 12, then a true or high output bit from one of them is generated and is provided via OR gate 66 to an input of AND gate 60. OR gate 66 receives the respective outputs of memory read decoder 62 and memory write decoder 64. If a memory read or write is thereby detected and comparator 52 detects an address match, then two of three inputs to AND gate 60 are true. The output of flip flop 70 is provided as the third input to AND gate 60. State machine 58, in response to the command signal from the peripheral device at step A, generates during step B a signal STARTRMW to set flip flop 70. If CPU 12 attempts a memory read or a memory write, to the same memory address as that then being serviced by IOU 16, while the IOU is performing a Read-Modify-Write, then all three inputs to AND gate 60 are high. The resulting high AND gate 60 output is provided via OR gate 72 to the data (D) input of data-type flip flop 68 which thereby produces, through an appropriate bus driver 74, the retry signal which is sent over system bus 18 to CPU 12. When at event F the Read-Modify-Write between IOU 16 and memory 14 is complete, IOU state machine 58 resets (signal ENDRMW) flip flop 70, causing the output of AND gate 60 to go false or low and thereby preventing further production of the retry signal by IOU controller 54. System bus 18 includes a bus clock which clocks and synchronizes all signals placed on that bus. Flip flop 68 is clocked via clock signal CK, which is synchronized with the bus clock and thus is in synchronization with signals on bus 18. For example, the bus clock signal could be provided to IOU 16 and applied to flip flop 68 as clock signal CK. Flip flop 68 is thereby clocked sufficiently often to be responsive to changes in AND gate 60 output.

One feature of the apparatus of FIGS. 2–4 is that a memory Read-Modify-Write is accomplished even though memory 14 itself is not capable of internally performing a Read-Modify-Write by itself. That is, although the memory just does packet reads and packet writes, the IOU 16 can accomplish a Read-Modify-Write operation, because of the inclusion in IOU 16 of the four registers 42 through 48, controller 54, comparator 52 and register 24. Thus, with the present invention, an I/O module which can perform Read-Modify-Write can be added as an upgrade to a pre-existing data processing system whose memory module(s) cannot perform RMW. This upgrade is made particularly easier for a computer system having multiple memory boards or modules, such as the system of FIG. 1. Also, the RMW architecture of FIGS. 2–4 is especially (but not exclusively) economical for a new or upgraded computer system having multiple memory boards or modules, such as the system of FIG. 1. By having the RMW logic in IOU 16, circuitry is saved. If the RMW logic is instead located in the memory, then that logic would have to be repeated on each memory board or module.

Besides, by having the RMW logic in IOU 16, the system of FIG. 1 is open-ended in that multiple IOU's can be added to bus 18 as needed and each added IOU can include its own RMW logic. Without this feature, the number of units on bus 18 that can perform RMW would be predetermined by the number of times that the RMW control logic for each unit is repeated in each memory module, instead of using the FIG. 4 logic in the IOU(s). For very small systems, the total size of the RMW control logic would then be too large. For very large systems, the total size of the RMW control logic would then be too small. If the design of the computer system placed the RMW control logic in or with the memory, then the system designer would be faced with a dilemma regarding how many units on the bus can initiate RMW.

The configuration of FIG. 2 furthermore avoids any need to compare the identity of the unit for which RMW is being performed, with the identity of the unit attempting to access memory during RMW. This is because in FIG. 2 the RMW logic is located in the unit which is initiating the RMW operation (such as IOU 16 or another IOU) and not in memory nor in a unit directly connected to or associated with memory. Therefore, any memory read or write by another unit at the RMW address is not allowed.

State machine 58 of FIG. 4 also generates the control signals on lines 76 for the already described control of registers 42, 44, 46 and 48. When state machine 58 receives on line 56 one command code from a peripheral device, the state machine in response generates on lines 76 the control signals for registers 42–48, and generates on line 78 the appropriate OP code for memory unit 14.

Figure 5:
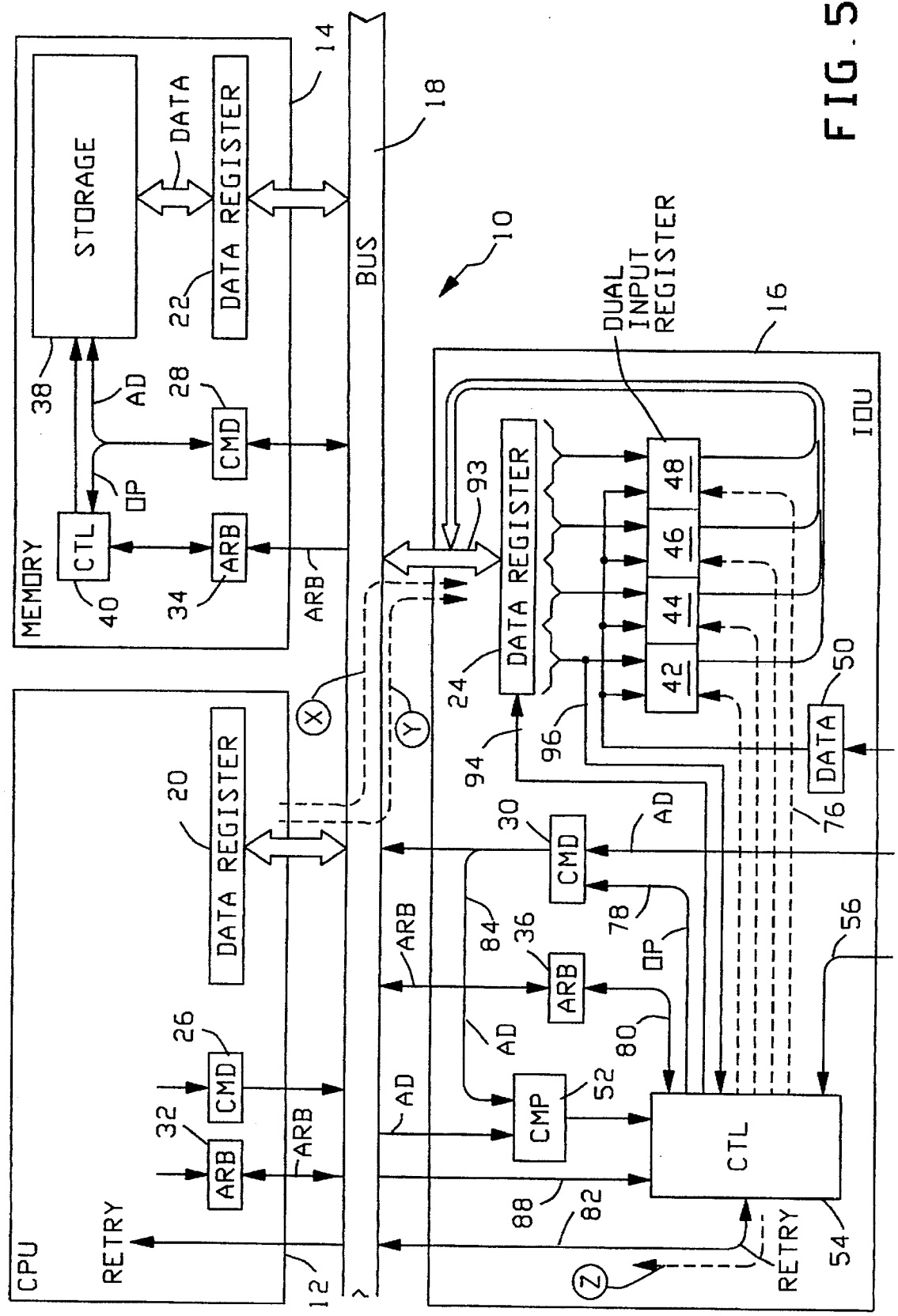
FIG. 5 illustrates a different set of signals and a different sequence of signal paths for another mode of operation of the system of FIG. 2.

FIG. 5 illustrates the signal flow for a different retry operation for the system of FIG. 2. This FIG. 5 sequence generates a retry signal in response to a packet being sent from CPU 12 directly to IOU 16 whereas in FIGS. 3 and 4, a retry signal is generated when no packet is sent to IOU 16. In the sequence of FIG. 5, the components of FIG. 4 are not used, except for OR gate 72, D-type flip flop 68, bus driver 74 and system bus 18. The sequence of FIG. 5 occurs when register 24 of IOU 16 is filled by the bus transfer at event X and an attempt Y is made to send another packet to the filled register. At step X, a packet is provided from CPU data buffer 20 to IOU register 24. At step Y, a second pocket is provided from CPU data register 20 to IOU register 24 via system bus 18, but the input buffer is already full, resulting in generation of a signal at step Z on line 92, which results in generation of a retry signal on line 82. The retry signal is then provided from IOU 16 to CPU 12.

FIG. 5 illustrates, for the system of FIG. 2, signal paths and sequences for the situation where the retry signal is generated by a module in response to that module being sent some words directly on the bus. In contradistinction, for the situation illustrated in FIG. 3 the retry signal is generated when a CPU module is sending words to a memory module and a third module, the IOU, causes the retry even though it is not being sent anything on the bus but instead is snooping as to what is going on the bus. FIG. 5 illustrates a full buffer situation in which a retry would occur, while FIG. 3 illustrates a Read-Modify-Write situation where a retry signal is generated to permit completion of the Read-Modify-Write operation and to prevent reading of outdated data before the Read-Modify-Write operation is completed.

Some of the structure of FIG. 4 is utilized to produce the retry of FIG. 5. As shown in FIGS. 4 and 5, state machine 58 of IOU controller 54 in response to bus arbitration signals on line 80 sends a signal (such as a load pulse) on line 94 to register 24 to tell the input register to read data from system bus 18. register 24 receives this data via line(s) 93. This data is then provided to registers 42, 44, 46 and 48. This data includes a field containing the message OP code. State machine 58 receives via line 96 some portion of this data, which tells the state machine that register 24 has been loaded with data. For example, state machine 58 receives the content of the OP code field via line 96. Although the OP code field is shown in FIG. 5 as being provided from registers 24 to register 42, the OP code field can be located elsewhere in the received packet, and can be provided to another of registers 42, 44, 46 and 48. State machine 58 could read appropriate bit(s) on line 96, or could decode the OP code field. If state machine 58 then detects via line 80 a second message, indicating that a second write to register 24 is being attempted before IOU 16 is ready to accept additional data, it generates a "buffer full" signal on line 92. This "buffer full" signal is provided via OR gate 72 to flip flop 68. In response to this "buffer full" signal, flip flop 68 causes generation of a retry signal. When state machine 58 stops generating the "buffer full" signal (such as after a suitable preset delay, or because the OP code no longer appears on line 96), flip flop 68, with the next clock signal CK pulse, stops causing generation of the retry signal. As another example, the "buffer full" signal on line 92 could be the carry from the most significant bit of register 24.

State machine 58 can for example be one or more programmable logic devices. State machine 58 can for example be a cluster of programmable logic devices. One example of a programmable logic device that could be so used is the PLUS405-55 Field-Programmable Logic Sequencer produced by Signetics and described in the *Signetics PLD Data Handbook* 1990 at pages 344–349.

In FIG. 3, IOU 16 is causing a retry even though the IOU is not being sent anything on bus 18. IOU 16 is here snooping as to what kind of information is being transferred on the bus between CPU 12 and memory 14 with which the IOU is not directly involved. IOU 16 looks at the traffic on bus 18 via signal path D2 even though the IOU is not involved in that traffic. If certain signals occur on bus 18 between CPU 12 and memory 14, then IOU 16 causes a retry to preserve the integrity of a simultaneous Read-Modify-Write operation. In effect, IOU 16 operates as a memory lock out unit. IOU 16 here is locking out CPU 12 from getting into memory 14 under certain conditions. In FIG. 3, the IOU is locking out the CPU so that the IOU can do a Read-Modify-Write. It is the Read-Modify-Write that gives rise to the need for IOU 16 to lock out CPU 12 from using memory 14.

The arbitration signals ARB variously produced by logic 32, 34, and 36 are primarily there to decide which module utilizes the bus at any one time. If there are multiple requests by different modules to use bus 18, then the bus is time shared using the arbitration signals to decide which module gets the bus in each particular time slot. If desired, the arbitration signals can be generated by an external bus controller (not shown) which in response to a module's request to use bus 18 decides which of these requests would be granted, with a grant signal being provided by that controller to the module that is thereby granted the right to then use the bus. When that module is granted permission to use the bus, the module puts out its message on the bus and with that message it has to have a destination field saying where this message is going to go. For example, when transfer D1 from CPU 12 to memory 14 occurs, the destination field would be the memory and all other modules not having that destination field should ignore the message. However, in accordance with the present invention, IOU 16 would not ignore the message, notwithstanding that the destination field on the message does not identify the IOU. Instead, IOU 16 would ignore the destination field and look at the message in order to determine whether a retry signal should be generated as shown in FIG. 3. This gives memory 14 a new lock out capability. Here, IOU 16 on bus 18 gives memory 14 a Read-Modify-Write capability which by itself the memory does not have. The memory itself cannot perform a Read-Modify-Write operation, but can only read and write a full packet respectively to or from each addressed memory location.

As used herein, the term "packet" is used to identify the data, particularly the data size, that is sent on system bus 18, while the term "word" is used to describe the size of data provided by the peripheral devices to IOU 16.

For bus 18, as with most buses, there is a certain set of bits which will specify the destination on the bus as to where in the system all of the other information is intended to go. There is shown in FIG. 3 register 20 of CPU 12 which is indicated as the source of information for signals D1 and D2 but as part of that information there will be a destination field. For signals D1 and D2, the destination field will specify, for example, that memory unit 14 on bus 18 is the module for which that information is intended. Similarly, in FIG. 5, for transfers X and Y from CPU 12 to IOU 16, there are some bits on bus 18 that tell IOU 16 that the information being transferred in X and Y is, for example, for the IOU, that is a destination field. Registers 26, 28 and 30 could be utilized to receive and detect the destination field. Alternatively, each module 12, 14, 16, etc. could be provided with a separate register for that purpose that would also be connected to system bus 18. When a message goes out on bus 18, then all modules connected to that bus (except the module sending the message) would compare their own internal destination number to the destination number that goes out on bus 18 with the message. For any module that has a destination number that matches the destination number with the message, that module would accept the message on the bus.

The Read-Modify-Write operation described above in connection with FIG. 3 is for a Read-Modify-Write that involves less than a full packet write. If a peripheral device wishes to provide a full packet of data to be written into a single addressed location in memory, e.g. the peripheral device was to provide all four words of a full packet, then IOU 16 could simply perform a full packet write to memory without the need for a Read-Modify-Write operation. However, if a peripheral device via IOU 16 wishes to write just one, two or three words into a single memory address location that has a capacity of four words, then the Read-Modify-Write operation described above in connection with FIG. 3 must be performed, because the memory alone cannot perform that kind of a (e.g. a partial) write. For example, if IOU 16 is going to write the fourth of four such words, and words one, two and three in the memory are to remain unchanged, then the IOU first reads from the memory all four words as stored therein, throws the fourth word away, takes the fourth word that it got from the peripheral device, merges it with words one, two and three that it got from the memory, and then does a full packet write back to memory. This control is accomplished utilizing registers 42 through 48 and the four individual read/write control lines provided from controller 54 to individually control those four registers.

Only a certain packet size can be read from or written to a single addressed location in memory 14. If IOU 16 or some other module has a need to write, at a certain memory location, information which is not a full memory packet, but just wants to change a part of a full memory packet (e.g. just change a couple of bits or change one word out of four words), then the Read-Modify-Write operation described above is necessary. In general, every memory has a certain memory word size, such as 32 bits or 64 bits, referred to herein as a packet. Ordinarily, in order to change even one or two of those bits, it is necessary to again write the entire packet into that memory location. But there are situations that arise from time to time where a module connected to bus 18 does not have a full packet to write, but only a part of a packet, for which the above-described Read-Modify-Write operation can be utilized.

Furthermore, the present Read-Modify-Write operation could be used any time that there is a delay between receipt of new data by a module and transmission of that new data to the memory. During such a delay, it would be undesirable to have another module perform a read from the same memory location that is to be written to. For that situation, a memory lockout and retry would be useful. This situation would apply whether a partial packet write as well as a full packet write is to be accomplished. Thus, the memory lockout described above could still be used even if a full word is to be written to memory.

OP is an instruction signal that is sent out by IOU controller 54 at step B as well as at step F to tell memory 14 what to do with the data then being sent on bus 18. For example, for step B there would be a read OP code going from IOU 16 command register 30 to memory 14 command register 28, while at step F there would be a write OP code going from the IOU command register to the memory. These are OP codes generated by the IOU. Similarly, at step D there would be either a read OP code or a write OP code generated by CPU 12 and being sent on bus 18 from command register 26 to memory 14 command register 28. Each such OP code would be generated contemporaneously with the indicated step or signal sequence of FIG. 3.

As described above, the term "eavesdrop" could be utilized in lieu of "snoop".

Some of the many advantages of the invention should now be readily apparent. For example, novel apparatus and method have been provided which are capable of preventing or locking out other parts of a system from accessing a portion of a memory for which a Read-Modify-Write operation is being performed. This lock out feature would also be useful for any other situation where there would be a delay in accomplishing a change in memory content, during which delay access by other parts of a system to that portion of memory would be undesirable. Utilization of outdated data by other parts of a computer or other system would thereby be avoided.

Since IOU 16 and memory 14 are each separately connected to bus 18 and are not directly connected to each other, the Read-Modify-Write capability of the present invention can be added to an existing system as an upgrade. This upgrade can be accomplished by adding IOU module 16 to an existing system, and requires no modification of or replacement of memory module 14. Thus, the lockout feature of the present invention need not be associated with any particular memory module. Also, there is no need for an additional bus to accommodate the present invention; a single system bus suffices. Because the RMW circuitry appears in the IOU and not in the memory, expendability and flexibility of the memory capacity is facilitated. For the same reason, circuitry is saved, since there is no need to include RMW circuitry in each memory board or module.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. An information processing system, comprising:

a memory having a plurality of individually addressable memory locations;

a bus connected to said memory;

at least one first module connected to said bus and capable of reading information from or writing information to said memory via said bus; and a second module connected to said bus;

wherein said second module includes a circuit which executes a read-modify-write command by: a) sending a first read command with a particular address to said memory, b) subsequently and independently of any command from said first module, sending a first write command with said particular address to said memory, and c) sending a control signal to said first module, in response to said first module sending a second read command with said particular address to said memory between said commands from said second module, which directs said first module to retry only said second read command and permits said first module to send additional read commands, before said first write command, with any address that differs from said particular address;

wherein said first module includes a circuit which retries said second read command solely in response to just said control signal;

and wherein said memory includes a circuit which executes said first read command and said first write command from said second module without ever signaling said first module that said first module has accessed an address which is involved in said read-modify-write command.

* * * * *